United States Patent [19]

Botz

[11] 4,125,170

[45] Nov. 14, 1978

[54] FORWARDLY PIVOTING BONNET OR HOOD FOR A MOTOR VEHICLE

[75] Inventor: Hans D. Botz, Eindhoven, Netherlands

[73] Assignee: Volvo Car B.V., Geldrop, Netherlands

[21] Appl. No.: 804,551

[22] Filed: Jun. 8, 1977

[30] Foreign Application Priority Data

Jun. 22, 1976 [NL] Netherlands ........................ 7606761

[51] Int. Cl.[2] ............................................ B62D 25/10

[52] U.S. Cl. ................................ 180/69 C; 16/128.1; 16/163; 16/191; 296/76

[58] Field of Search ................ 180/69 C, 69 R, 54 A; 16/128.1, 163, 191; 296/76

[56] References Cited

U.S. PATENT DOCUMENTS

| | | | |
|---|---|---|---|
| 2,090,473 | 8/1937 | Crabb | 180/69 C X |
| 2,193,111 | 3/1940 | Peterson | 180/69 C X |
| 2,548,492 | 4/1951 | Rivard et al. | 180/69 C |
| 3,767,001 | 10/1973 | Chupick | 180/69 C |

FOREIGN PATENT DOCUMENTS

| | | | |
|---|---|---|---|
| 2,313,949 | 10/1974 | Fed. Rep. of Germany | 180/69 R |
| 622,046 | 4/1949 | United Kingdom | 180/69 C |

*Primary Examiner*—Joseph F. Peters, Jr.
*Assistant Examiner*—Milton L. Smith
*Attorney, Agent, or Firm*—Price, Heneveld, Huizenga & Cooper

[57] ABSTRACT

Many motor bonnets of front motor vehicles produce danger in case of frontal collision, because the bonnet then is pressed like a razor into the passenger compartment of the vehicle. Other bonnets cannot readily be opened because the edge of the cover to be gripped, is not reasonably accessible. This danger and disadvantage are overcome by using hinge members having two points of rotation, especially swan necks, and by using rectilinear recesses accommodating rolls in such a way that the bonnet can easily be manipulated but nevertheless is very safe in case of a frontal collision. For further protection of the user against the bonnet being blown shut, a special spring bias fixing rod element is incorporated into the bonnet.

8 Claims, 7 Drawing Figures

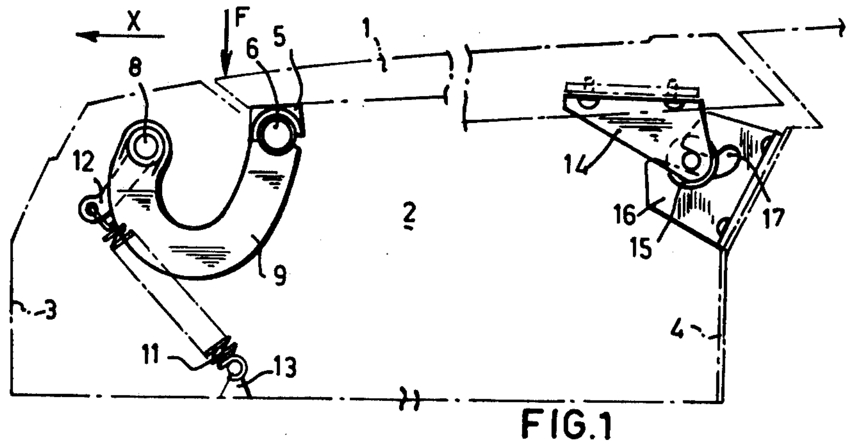
FIG.1
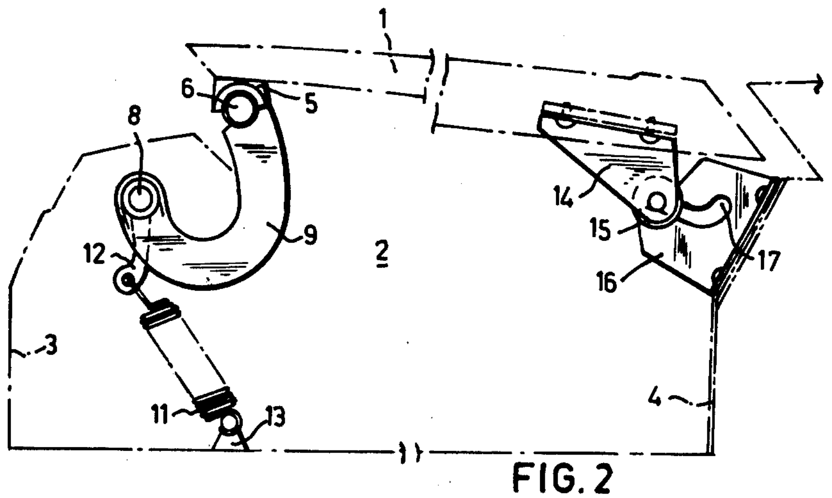
FIG. 2
FIG. 3
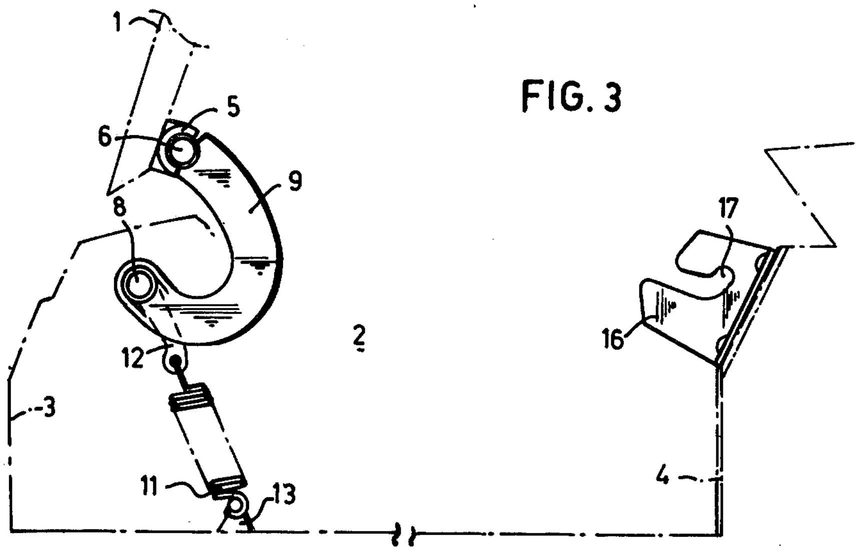

FORWARDLY PIVOTING BONNET OR HOOD FOR A MOTOR VEHICLE

The invention relates to a cover, such as a motor compartment bonnet of a road vehicle, which can be used to close, the upper side of a space mainly limited by walls, which cover can be secured in the closed position.

Such covers are known in numerous embodiments. Some of the known embodiments have the drawback that they produce a risk in case of a frontal collision, because the bonnet then is pressed like a razor into the passenger compartment of the vehicle. Other known motor bonnets have the drawback that they cannot be opened readily because the edge to be gripped of the cover is not reasonably accessible.

The invention's object is providing a solution for the problems and drawbacks mentioned above.

This is achieved according to the invention in that one of the edges of the cover is connected with a wall of the space by at least one member having two points of rotation. The member connecting the two points of rotation may consist of a swan neck. In orer to eliminate the danger of the inward penetration of the cover into the passenger compartment, according to the invention, near the edge of the cover facing away from the edge where the member having two points of rotation is present, there is provided at least one roll which, in the closed position of the cover, is located near the end of a rectilinear recess in a guide plate which may be attached to the separation wall or to the cover. Especially with a view to safety a slip opening positioned angularly to the rectilinear recess may be provided at the rectilinear recess.

When the cover is used as a motor bonnet for a road vehicle with the motor in front, it has been found efficacious to mount a pair of swan necks on a common shaft so that they are rotatable with respect to the front wall of the motor space. The shaft mounts an arm which is held under tension stress by a spring in such a way that when the fixing or latching member for the cover, present between the two swan necks, is released, the bonnet displaces itself substantially to the front and upwards to an intermediate position so that the roll leaves the recess and the bonnet can be gripped at the rear.

In the intermediate position, a couple equilibrium is formed, the couple exerted by the spring being in equilibrium with the couple transferred by the bonnet via the stop at the rotation point of the support to the motor bonnet with the stop on the swan necks. Thereupon the bonnet can be readily gripped at the rear and opened further.

The rotation of the bonnet toward the entirely opened position about the rotational attachment of the support to the bonnet can be limited by stops at the motor bonnet and the swan necks attachment which face away from the said stops for determining the intermediate position.

To protect the cover and thereby the user against blowing shut of the cover, it has been found efficacious to support rotatably a fixing rod in the vicinity of at least one swan neck which fixing rod is provided, at the end facing away from the extremity, with an element extending in transverse direction which can move through a groove in a plate attached to the cover, said groove having a recess for fixing the cover in the opened position.

The element extending in transverse direction is held under tension by blade springs.

The invention will be further elucidated herebelow with reference to the drawing in which an embodiment of a cover according to the invention is represented by way of example.

In the drawing:

FIG. 1 is a partially diagrammatic longitudinal section of a cover in the closed position.

FIG. 2, in the same way as in FIG. 1, shows a cover according to the invention in the intermediate position.

FIG. 3, in the same way as in FIGS. 1 and 2, shows a cover according to the invention in the entirely opened position.

FIG. 1 represents diagrammatically a cover 1, which can be raised, for the closing of a motor space 2 of a vehicle, which vehicle is not further represented.

In FIG. 1 the driving direction is according to the arrow X. In this case the space 2 is delimited, inter alia, by a front wall 3 and a separation wall 4 between the space 2 and the passenger space behind it.

Figure 4:
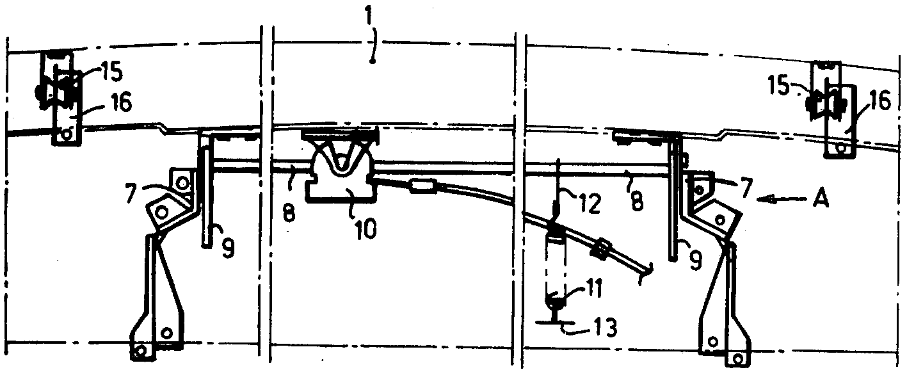
FIG. 4 is a partially diagrammatic front view of the cover and the surrounding parts of FIGS. 1-3.

The following special parts are present in the vicinity of the front wall 3: at the cover a rotation point support or bracket 5 with a pin 6 is present and at the front wall 3 itself there are two supports 7 (FIG. 4) rotatably supporting a shaft 8 on which shaft two swan necks 9 or strap members are located. By the parts 6, 8 and 9 a so-called double hinge is formed which permits the motor bonnet or cover to move into an intermediate position (FIG. 2), with some displacement to the front and upwards having taken place in respect to the position shown in FIG. 1, and also to reach an opened position (FIG. 3) in which the pins 6 lie still more to the front and with the cover having been manually pivoted about 90°.

The intermediate position represented in FIG. 2 is reached as follows: after release of the fixing member or latch 10 situated between the swan necks 9 (FIG. 4) a spring 11 exerts a couple about the shaft 8. The spring 11 is capable of doing this because it is positioned between an arm 12 and a supporting point 13 located in the space 2. Under the influence of the said couple, the front edge of the motor bonnet moves upwards and to the front with respect to the position illustrated in FIG. 1 and reaches the position represented in FIG. 2. It is also possible to employ a helical spring exerting the couple in question mounted on one or both extremities of the shaft 8. At the rear edge of the motor bonnet roll 15 are positioned on the supports 14 which rolls can be moved through a rectilinear recess in two guide plates 16 attached to the separation wall 4. Because these recesses are designed to be inclined upwardly toward the front the rear edge of the motor bonnett also moves upwards a little and due to this it can be gripped with one hand. Thus, the bonnet is capable of being rotated further to the opened position represented in FIG. 3.

At the rear of the rectilinear recess in the guide plates 16 a slip opening extending rearwardly and upwardly is present which opening assures that, in case of a frontal collision, the rear edge of the motor bonnet cannot enter the passenger compartment.

Figure 7:
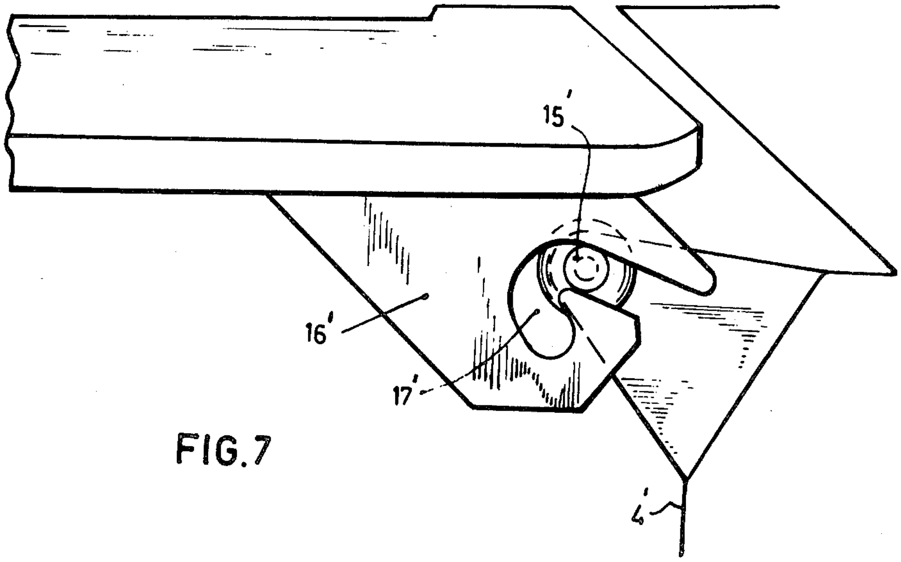
FIG. 7 shows another embodiment of the safety construction for preventing the penetration of the motor bonnet into the passenger compartment.

A variant of this safety construction or catch is represented in FIG. 7. There the guide plates 16 are attached to the motor bonnet and provided with a slip opening 17' with the rolls 15 being attached to the separation wall 4'.

To close the motor space 2, the cover 1 is manually moved again to the intermediate position, whereupon by the exertion of a force, on the front edge of the bonnet substantially in the direction of the arrow F (FIG. 1), this bonnet again assumes the position shown in FIG. 1 and remains there because the fixing member 10 (FIG. 4) again locks the bonnet in closed position.

Figure 5:
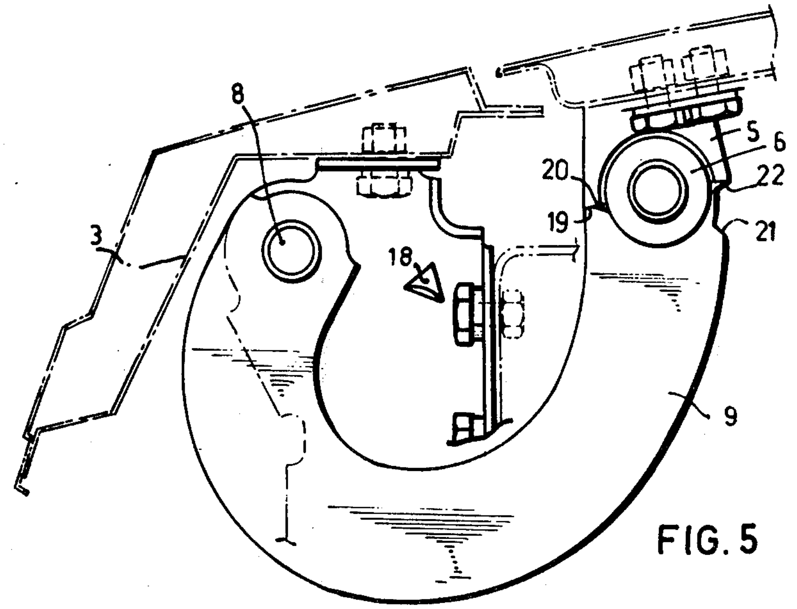
FIG. 5 is a view of a swan neck on a more enlarged scale.

In FIG. 5 another swan neck 9, according to the invention, is represented on an enlarged scale. This figure shows that the swan neck near the shaft 8, is provided with a stop 18 for establishing the fully opened position of the motor bonnet. However, the stops 19–22, near the pins 6 of the rotation point supports 5, are of more importance. In the entirely closed and the entirely opened positions the stops 19 and 20 on the swan neck 9 and the rotation point support 5 are in contact with each other, whereas in the intermediate position the stops 21 and 22 of the said parts are in contact. In the intermediate position then a couple equilibrium occurs between the force exerted by the spring 11 and the gravitational force of the bonnet.

Of course, it should also be possible to fix the cover in the opened position in a dependable way. There are vehicles in which such a holding means is entirely missing, while the positioning of a manually operated fixing rod is being completed. Such a fixing rod, of course, is not always made use of by the user which may cause accidents when the motor bonnet snaps shut due to a sudden gust of wind.

Figure 6:
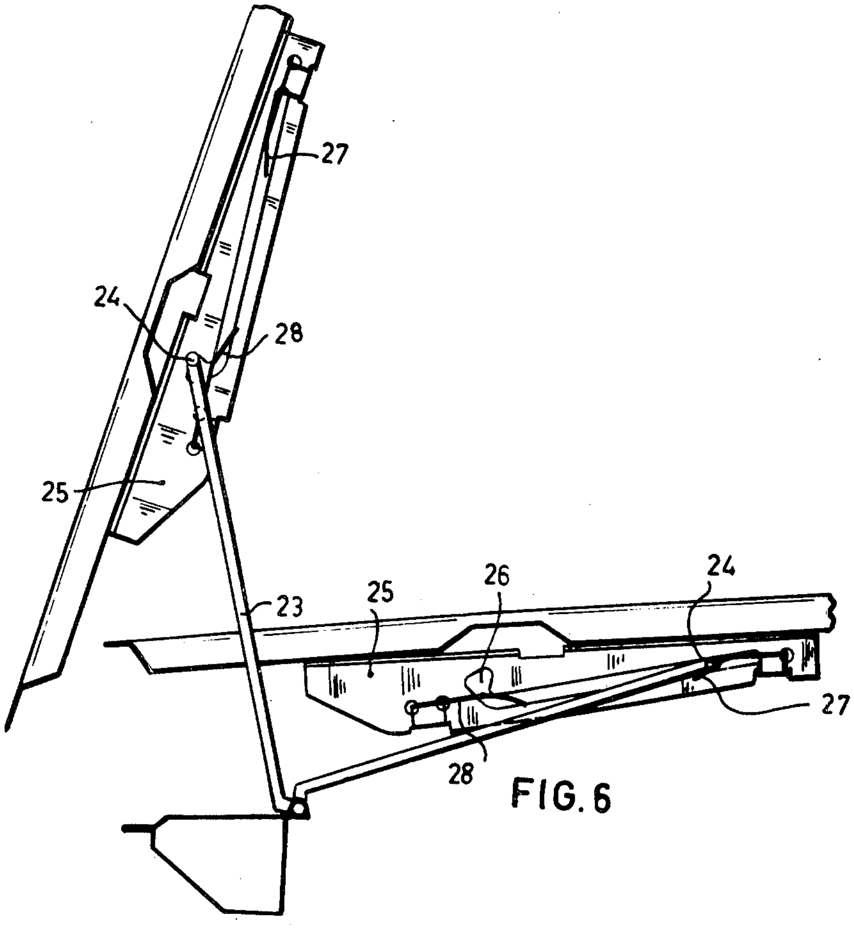
FIG. 6 is a partially diagrammatic side view of a fixing rod.

Therefore, as represented in FIG. 6, a fixing rod 23 is rotatably supported, which fixing rod at the end facing away from the point of rotation is provided with an element extending in transverse direction. This element is capable of moving along a groove or elongated slot in a plate or elongated flange 25 attached to the cover, said groove having a reentry section on recess 26 to fix the cover in the opened position. The element extending in transverse direction is held under tension by blade springs 27 and 28, the blade spring 27 being capable of cooperating somewhat in locating the cover in the intermediate position (FIG. 2), whereas the blade spring 28 ensures additional safety in the opened position of the cover.

Although the invention has been described hereabove by way of an embodiment in the shape of a motor bonnet cover it is to be understood that a cover, which can be raised, with the characteristics described above could very well be used also for example, for closing the luggage space of a vehicle. Also, other embodiments than those represented are possible and are to be considered within the scope of the following claims.

What is claimed is:

1. In a motor vehicle having a bonnet and a body, means for mounting the bonnet to the vehicle, said bonnet being one which opens by pivoting upwardly and forwardly, said means comprising: a hinge having a strap member, said strap member being pivotally mounted at its forward end to said body and at its rearward end to the front end of said bonnet; said strap member as it pivots upwardly about its forward end lifting said bonnet and shifting it forwardly; means biasing said strap to pivot upwardly and forwardly; a bracket secured to the underside of said bonnet to provide the pivotal mounting for said bonnet, said bracket having a rear shoulder thereon, said strap having a rear shoulder thereon, said shoulders being positioned to engage each other when the bonnet and strap are at an intermediate dwell position and when engaged forming a stop limiting said pivotal movement of said strap at the intermediate dwell position under the influence of said biasing means; a catch at the rearward end of said bonnet, said catch having means positively holding said rearward end of said bonnet against upward or rearward movement when said strap is rearward of said intermediate dwell position.

2. The combination as described in claim 1 wherein said bracket and said strap each have forward shoulders thereon limiting upward, forward pivotal movement of said bonnet about the rearward end of said strap to force said strap to pivot about its forward end during a major portion of the opening pivotal movement of said bonnet.

3. The combination as described in claim 2 wherein said biasing means continues to bias said bonnet into its fully raised position after said bonnet is pivoted beyond said intermediate dwell position.

4. The combination as described in claim 2 wherein said biasing means is a resilient element applying a torsional load to a shaft secured to said strap and mounting said strap on said vehicle body.

5. The combination as described in claim 2 wherein a pair of said straps are provided, one adjacent each side of said bonnet, said forward ends of said straps being secured to a shaft mounted on the vehicle body for rotation with said shaft; said biasing means including a pair of levers secured to said shaft, one adjacent each of said straps and a pair of springs, one secured to each of said levers.

6. The combination as described in claim 2 wherein an elongated flange depends from the underside of said bonnet, said flange extending in a fore and aft direction and having an elongated slot therein, said slot having a reentry section extending upwardly and rearwardly at an acute angle at its forward end; a support rod pivotally mounted at one end to said body and having its opposite end slidably seated in said slot; said opposite end engaging said reentry section when said bonnet is fully open and holding said bonnet against closing movement.

7. The combination as described in claim 6 wherein spring means are provided at each end of said slot for restraining movement of said end of said rod, said spring means at said forward end urging said opposite end of said support rod into said reentry section.

8. In a motor vehicle having a body means for mounting the bonnet for the vehicle, said bonnet being one which opens by pivoting upwardly and forwardly, said means comprising a hinge having a strap member, said strap member being pivotally secured at one end to said vehicle body and at its other end being pivotally secured to and beneath the front end of said bonnet, said pivotal connections of said strap member, when said bonnet is closed, lying substantially in a horizontal plane; a catch at the rear end of said bonnet, said catch having a keeper plate having a curved slot therein and a latch finger slidably received in said slot; said keeper plate being on one of said bonnet and body and said finger being on the other thereof; said slot in said keeper plate having a blind end portion extending away from the main axis of said slot at an acute angle; means biasing said strap to pivot about its forward end in an upward direction; a stop on the bonnet engaging the strap for limiting the upward and forward rotation of said strap under the influence of said biasing means; said stop limiting the forward movement of said bonnet while said finger is engaged with said latch plate and the rear end of said bonnet is supported against downward movement but is free for upward pivotal movement.

* * * * *